United States Patent [19]

Norvell

[11] Patent Number: 5,565,254
[45] Date of Patent: Oct. 15, 1996

[54] COVER FOR INSULATION AND METHOD OF MANUFACTURE

[75] Inventor: Jean Norvell, Newark, Del.

[73] Assignee: W. L. Gore & Associates, Inc., Newark, Del.

[21] Appl. No.: 280,590

[22] Filed: Jul. 26, 1994

Related U.S. Application Data

[63] Continuation-in-part of Ser. No. 82,692, Jun. 25, 1993, Pat. No. 5,472,760.

[51] Int. Cl.$^6$ ............................... B32B 1/04; B32B 3/00
[52] U.S. Cl. ................... 428/71; 428/74; 428/76; 428/134; 428/136; 428/422
[58] Field of Search ............................ 428/71, 74, 76, 428/134, 136, 421, 422

[56] References Cited

U.S. PATENT DOCUMENTS

| 3,080,892 | 3/1963 | Plummer | 138/128 |
|---|---|---|---|
| 3,953,566 | 4/1976 | Gore | 264/288 |
| 4,194,041 | 3/1980 | Gore et al. | 428/315 |
| 5,102,711 | 4/1992 | Keller et al. | 428/71 |
| 5,360,653 | 11/1994 | Ackley | 428/71 |

FOREIGN PATENT DOCUMENTS

| 0320210 | 6/1989 | European Pat. Off. . |
|---|---|---|
| 1042794 | 9/1966 | United Kingdom . |
| 1342310 | 1/1974 | United Kingdom . |

OTHER PUBLICATIONS

Abstract Glass Industry, Nov., 1991, p. 28.
Abstract Paper, Film & Foil Converter, p. 148, Nov. 1981.
Abstract Satellite Week, p. N/A, Oct. 22, 1990.
Abstract Blade (Toledo, OH), pp. 32, 35, Mar. 1, 1990.
Abstract Arizona Republic (Phoenix, AZ), P.C; 1, Aug. 24, 1988.

*Primary Examiner*—Dhirajlal Nakarani

[57] ABSTRACT

An improved insulation package for insulating objects and method of making the same are disclosed. The insulation package comprises one or more layers of insulation material closed within a loose fitting cover. The cover is easily fitted around the pieces of insulation material. The insulation package saves time and labor compared to the previous method of prefabricating individual covers for each shape of insulation material. In a preferred embodiment, the cover can be formed of any of the following: water proof materials, water resistant materials, air permeable materials and combinations thereof.

3 Claims, 6 Drawing Sheets

COVER FOR INSULATION AND METHOD OF MANUFACTURE

RELATED APPLICATIONS

The present application is a continuation in part of U.S. Pat. No. application Ser. No. 08/082,692 filed Jun. 25, 1993, now U.S. Pat. No. 5,472,760.

BACKGROUND OF THE INVENTION

1. Field of the Invention

The present invention relates to thermal and sound insulation for objects, such as insulation installed within vehicles (e.g., aircraft, trains, boats, automobiles, trucks, and the like).

2. Description of Related References

Thermal insulation is widely employed in a variety of applications. While adding comfort and improved efficiency in certain common vehicle uses, like in automobiles, such insulation is critical to proper operation of other vehicles, such as maintaining a temperature gradient in high flying aircraft.

Insulation installed in many of today's vehicles must meet very stringent thermal and acoustic insulation requirements. As a result, the insulation material is often tightly packed into constricted areas and around many objects to ensure maximum insulation. Also, the insulation must perform under a wide range of environmental conditions. These demands are particularly strict in the design of aircraft which regularly undergo dramatic temperature, pressure, and humidity changes. Although not as extreme, other vehicles such as trains, automobiles and trucks, and watercraft, may also require considerable air-conditioning and acoustical insulation.

Complicating the process of insulating vehicles is the fact that their shells may contain many obstructions that insulation material must be fitted around (e.g., pipes, stringers, tubes, and structural ribs). Presently, to situate the insulation around ribs, stringers, and other similar obstructions, insulating material is either cut to size and a custom cover is formed to fit, or loose insulation is merely "stuffed" around the obstructions. In making customized covers, copious amounts of pressure sensitive tape are manually applied to the cover in order to close the seams and make a seal. Neither of these approaches is fully satisfactory. With the production of customized covers in particular, this is highly labor intensive and slow.

In addition to the space constraints, insulation must endure temperature and pressure variations. Very tightly sealed vehicles, such as jet aircraft, can experience extensive moisture build-up in the passenger cabin from breath, perspiration, steam from foods, etc. When the exterior of such vehicles is at a substantially lower temperature than the interior, the moisture vapor in the interior air tends to condense on the shell or within insulation surrounding the shell.

The build-up of moisture within insulation lining a vehicle's shell is a multi-faceted problem. First, many insulation materials commonly used today, such as fiberglass and certain foams, have a tendency to retain water once wetted. As a result, the insulation increases in its weight over time as condensation forms and remains within the; insulation. In vehicles where weight increases can result in substantial differences in fuel costs (e.g., aircraft), this build-up of moisture results in astronomical waste in fuel.

Second, the build-up and retention of water also poses a number of safety and health hazards. For example, the accumulation of water: (a) contributes to a corrosive environment on the concealed interior of the vehicle's shell and, if left unchecked, can weaken important structural parts; (b) reduces the maneuverability of the vehicle through excessive weight gain; and (c) promotes an unsanitary environment where microorganisms can grow.

Third, the presence of moisture in certain insulation will tend to distort or decay the insulation over time. This occurs dye to the increased weight of wet insulation in sidewalls which draws the insulation downward. Eventually gaps will develop which reduces both the thermal and acoustical insulative properties of the insulation. Water will also decay certain insulation materials which can further reduce their insulative properties.

Earlier insulations employed in aircraft and similar vehicles were simply loose fibers or batts packed between the shell of the vehicle and the interior walls. Among the deficiencies of this insulation system was that it tends to be hard to install and maintain, glass fibers are a health hazard during installation and removal, and the insulation tends to slide out of position.

More recently in the aircraft industry it has been recognized that the insulation should be regularly removed so that the interior of the fuselage can be inspected for corrosion and other problems. To accomplish this, a number of companies have begun wrapping insulation material with individually wrapped covers, such as a casing of MYLAR® polyester film or other impermeable membrane which resists liquid and moisture vapor penetration. While such materials are effective at preventing moisture migration through the cover, sometimes breathing holes must be added to the air impermeable water proof casings to allow air to vent out when the pressure changes. These pressure compensation holes have resulted in the inevitable ingress of moisture vapor and water build-up. Moreover, the fact that the casing material is essentially liquid and vapor impermeable means that, once the insulation becomes damp, the insulation package remains wet for a very long period of time.

In the parent application, it is disclosed that a protective water resistant, vapor permeable cover may be used as a wrap around insulation material. When installed within a vehicle, moisture vapor freely enters and leaves the insulative package, but condensate which may form within the insulative package is contained therein and does not leak out to cause problems within the vehicle. Since the cover is "breathable" to moisture vapor, condensation which may form within the insulative package is free to evaporate and dissipate when conditions permit. This is believed to be a major improvement in insulation packaging. But, it is also believed that further improvements are still possible.

For instance, existing covers have been designed to be tight fitting—matching the exact contours of the covered insulation. However, these tight fitting covers are expensive to produce and buy because a cover must be custom made for different shaped pieces of insulation material. This is a substantial cost considering that a typical large passenger jet air craft may have over 1300 different sized pieces of insulation. Custom fitted covers are a particular problem where insulation material must fit closely around unusual shaped objects, in tight spaces, or along curved surfaces. Presently there is no easy way to wrap such insulation with a cover. This has resulted in the use of loose (uncovered) insulation material (with its inherent handling problems) in tight applications or the laborious wrapping and sealing of each piece of irregularly shaped insulation. Neither of these solutions is believed satisfactory.

Accordingly, it is a primary purpose of the present invention to provide an insulation package having a cover which is easy to fit around irregular shaped insulation material.

It is another purpose of the present invention to provide an insulation package that can be readily installed or removed and maintained when positioned in tight areas or around objects to be insulated.

It is a further purpose of the present invention to provide an insulation package having a durable cover which has liquid water impermeable sections and vapor moisture permeable sections so that liquid water contained within the cover can evaporate.

These and other purposes of the present invention will become evident from review of the following specification.

SUMMARY OF THE INVENTION

The present invention provides an improved insulation package for use; in insulating virtually any form of object or structure. The insulation package of the present invention comprises a loosely fitted cover which can be shaped and compacted to fit are and virtually any form of insulation, and especially irregularly shaped insulation. Avoiding the costly and time consuming procedure of custom wrapping insulation, the loosely fitted cover of the present invention can be easily manufactured and then readily compacted to cover the insulation material and match its contours.

A preferred embodiment of the present invention is a cover that includes air permeable material. This allows the cover to adjust automatically to significant pressure changes without damage or compromise. Particularly preferred is a cover having at least one section formed of water impermeable and moisture vapor permeable material. The moisture vapor permeable material allows liquid water contained within the cover and insulation material to evaporate and pass through the cover.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
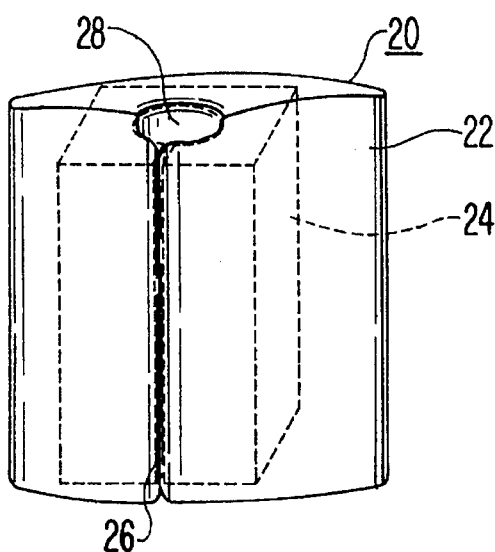
FIG. 1 is a three-quarter isometric view of the insulation package of the present invention shown with a cover shaped around a piece of irregularly shaped insulation material.
Figure 2:
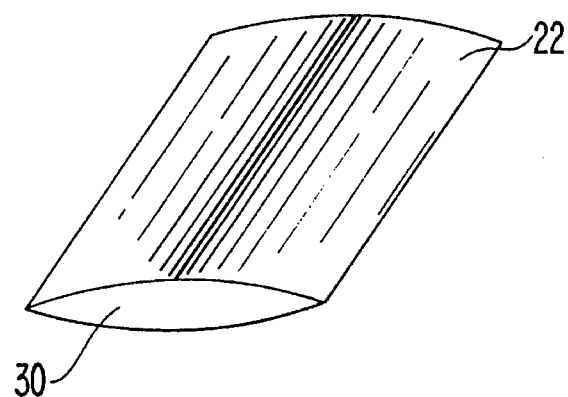
FIG. 2 is a three-quarter isometric view of the cover shown in FIG. 1 without the insulation material.
Figure 3:
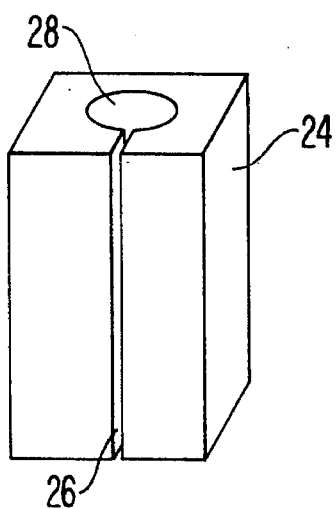
FIG. 3 is a three-quarter isometric view of the piece of irregular shaped insulation material shown in FIG. 1 without the protective cover.

FIGS. 1 through 3 illustrate a first embodiment of an insulation package 20 of the present invention. The insulation package 20 comprises a protective cover 22 sealed around a segment of insulation 24. The protective cover 22 is proportioned to be substantially larger than the insulation segment 24 so that it forms a loose fit around the insulation material 24. By forming the cover 22 from an air permeable material, the cover may be easily compressed around the insulation 24 so as to exactly match the contours of the insulation.

The present invention is particularly effective at sealing insulation that is "irregularly shaped." As is shown in FIG. 1, the cover 22 of the present invention will readily form fit to match all the unusual angles on virtually any form of insulation. In the instance shown in FIG. 1, insulation material 24 is encased by loosely fitted cover 22. The insulation material 24, also shown separately in FIG. 3, is rectangular in shape with a slit 26 running along its length connected to a center groove 28 along its length. This shape of foam insulation would commonly be employed to connect over ribs or similar obstructions in an aircraft's wall.

The cover 22 of the present invention, depicted in FIG. 2, has at least one side 30 open. The cover 22 is fitted over the insulation material 24. Next, the cover 22 is shaped and compressed to fit through slit 26 and against the center groove 28. This fitting allows a rib or other object to be positioned into the center grove 28 by insertion through slit 26.

The insulation package of the present invention eliminates the substantial expense of custom manufacturing custom covers for each shape and size of insulation. Today, manufacturers are custom fitting covers over insulation pieces. This custom fitting is an expensive, labor intense process where seams are manually made along each edge. With the loose fitting cover of the instant invention, only a limited number of shapes and sizes covers are required. These loose fitting covers are far easier and less expensive to produce since they can be made in easy to manufacture rectangular or other similar symmetrical shapes and can be produced in a relatively limited number of sizes to cover most insulation shapes.

While the insulation package of the invention comprises a protective; cover which may be fitted around virtually any shape of insulation material or materials, it is particularly suitable for use with irregularly shaped insulation material. "Irregularly shaped insulation" as used in the present application includes any object that has uneven proportions or contours, making it difficult to fit a conventional cover around. This term especially applies to insulation having indentations, gaps, openings, or uneven surfaces.

Figure 4:
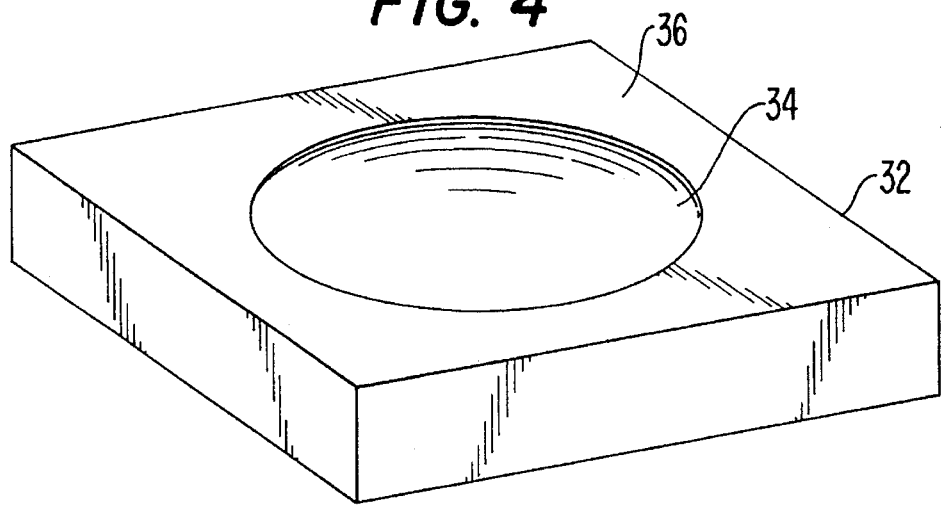
FIG. 4 is a three-quarter isometric view of one form of irregularly shaped insulation material having a depression on the top surface, suitable for use with the present invention.
Figure 5:
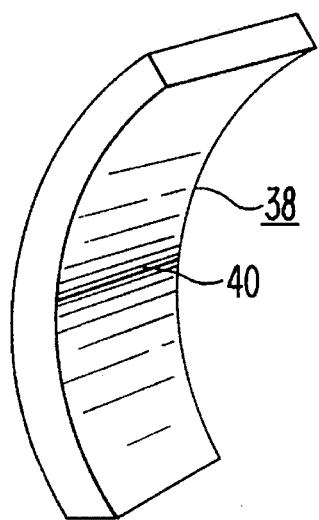
FIG. 5 is a three-quarter isometric view of another form of irregularly shaped insulation material, having a curved surface, suitable for use with the present invention.
Figure 6:
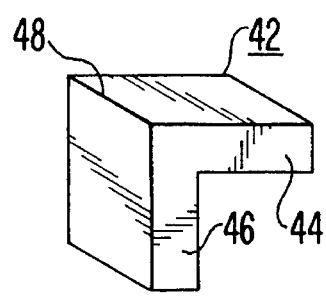
FIG. 6 is a three-quarter isometric view of still another form of irregularly shaped insulation material, having an angular body, suitable for use with the present invention.
Figure 7:
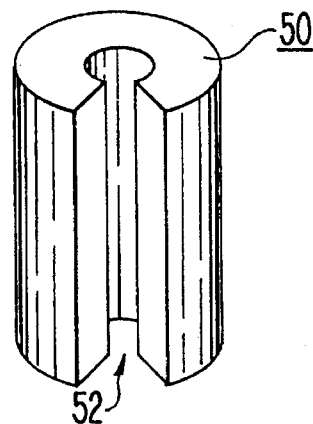
FIG. 7 is a three-quarter isometric view of a further form of irregularly shaped insulation material, having a cylindrical shape with a slot along its length, suitable for use with the present invention.

FIGS. 4 through 7 show some examples of objects the applicant considers "irregular" shaped insulation material. FIG. 4 depicts a piece of insulation material 32 with a rounded indentation 34 on the top surface 36. FIG. 5 represents a segment of insulation material 38 having a curve length 40. FIG. 6 is a segment of insulation material 42 having two legs 44, 46 connected at a right angle bend 48. FIG. 7 is a segment of insulation material 50 having a cylindrical shape with a slot 52 running along its length. It should be understood that the above described materials are only a sampling at the many possible irregularly shaped objects that can be covered and protected using the present invention.

Figure 9:
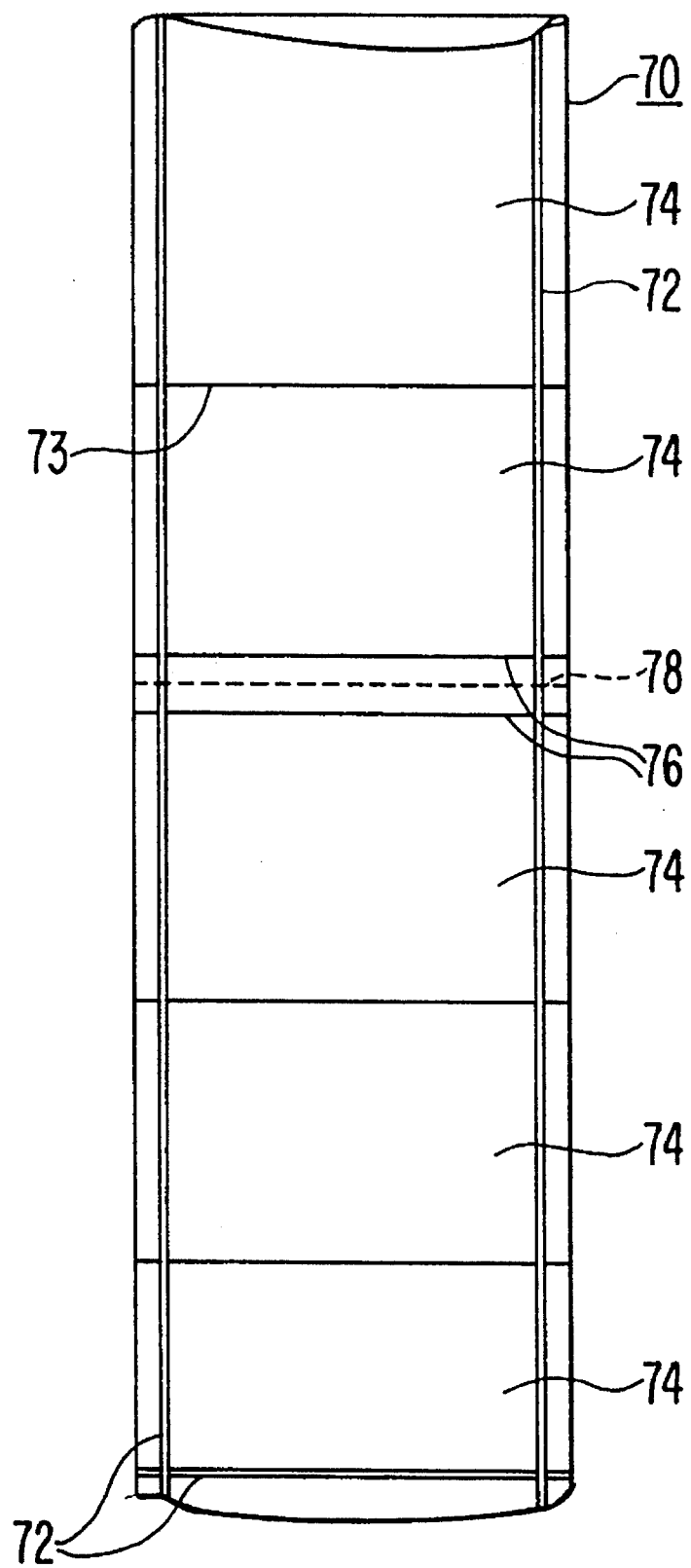
FIG. 9 is a top plan view of another embodiment of an insulation cover of the present invention.

The process of covering insulation material in accordance with the present invention may take any one of a variety of forms. For example, one embodiment of the present invention comprises delivering to a user a cover (such as shown in FIGS. 2 and 9) with at least one end open. The user may then insert any desired shape of the insulation material inside the cover, then seal the cover around the insulation material to provide a final insulation package. Using this technique, an insulation package may be very rapidly constructed, even by an end-user in the field, to adapt to most insulation shapes. As is explained in greater detail below, this technique readily lends itself to a variety of prefabricated cover designs.

The seal formed by the user can be made in an number of ways depending on the cover material and the requirements of the application (e.g., fire proof, non-out-gassing, etc.). For example, the seal could be formed by a heat sealing process, or by adhesives. The cover could be folded over or wrapped around the insulation material to obtain a better fit and to minimize the number of seals required. Excess cover material may be cut away. This would allow the installer to modify the insulation material near the work location and cover the insulation material to form the insulation package to be installed with a minimum of time and labor.

This on-site fitting would allow the user to make instantaneous modifications to a insulation package to fit the insulation package around difficult obstacles. Furthermore, the user could form holes or window openings in the insulation package to fit over conduits, openings, windows, or other obstacles. The user may then seal around the opening in the cover to encase the insulation material. In addition, hooks, fasteners, or other devices could be added to the cover to secure the insulation package in place.

The present invention is particularly directed to partially or completely sealed vehicles in which the build-up of moisture or condensate from perspiration, breath, food, moist cargo, steam from a galley, etc., may be a problem. As the term "vehicle" is employed herein, it is intended to encompass any form of device used to transport people, animals, and/or cargo, such as aircraft (e.g., airplanes, helicopters, spacecraft), land crafts (e.g., trains, automobiles, trucks, tractor-trailers), water craft (e.g., boats, shields, submarines, hovercraft), etc.

Figure 8:
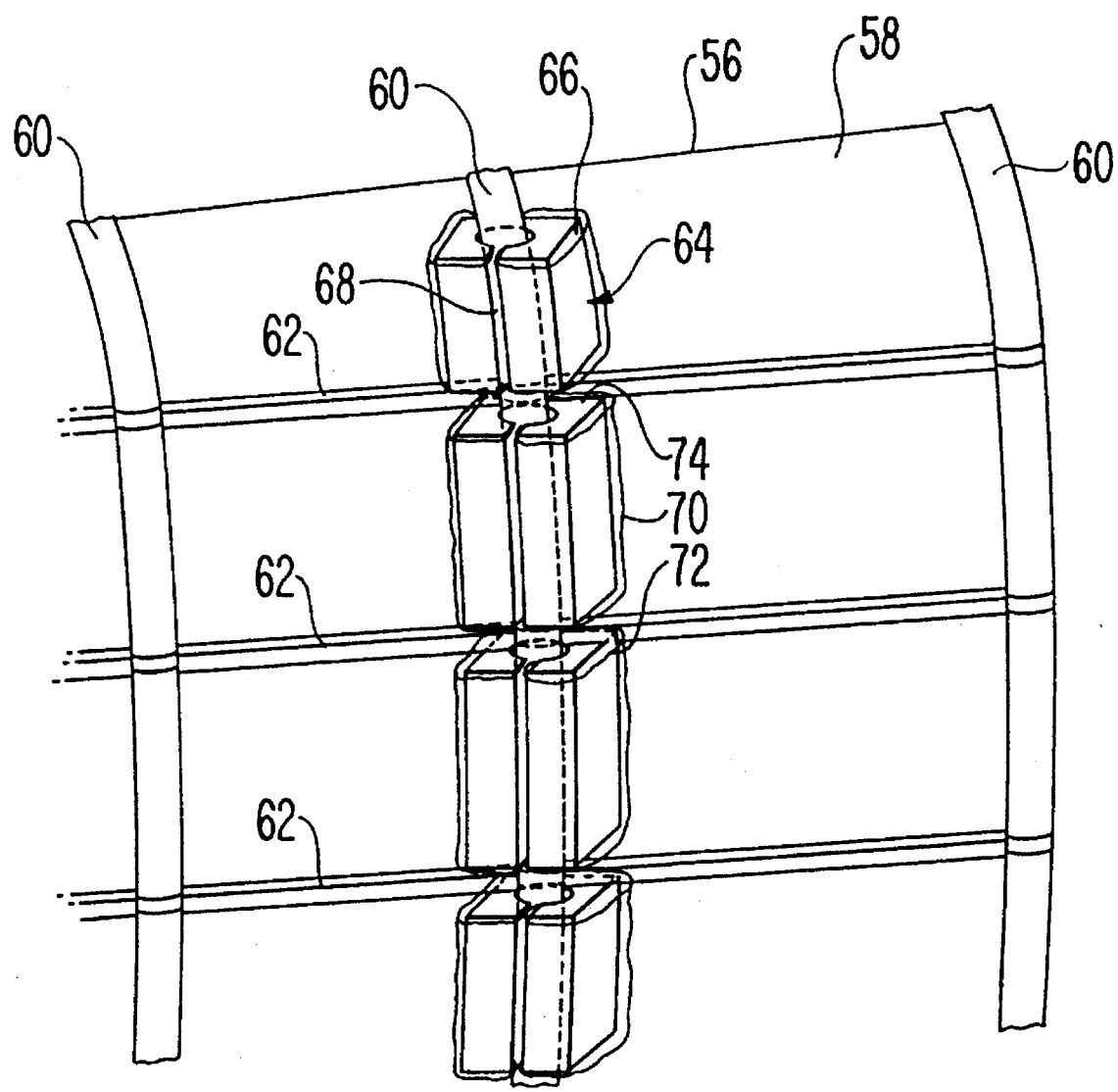
FIG. 8 is a three-quarter isometric view of one embodiment of an insulation package of the present invention shown mounted on an interior of an airplane.

As shown in FIG. 8, the interior of an aircraft has a curved shell 56 comprising a wall 58, ribs 60 and stringers 62. Insulation packages of the present invention (not shown) can be fitted between the ribs 60 and stringers 62 to insulate the shell from the interior of the plane. To provide insulation around for the ribs 60 and stringers 62, insulation package(s) 64 are installed. Insulation package 64 comprises a protective cover 70 (shown in FIG. 9), with pockets 74 and pieces of insulation material 66. The installation package 64 shown contains insulation material 66 similarly shaped to the material 24 shown in FIG. 3. The cover pockets 74 can be formed using similar sealing methods to form the covering shown in FIG. 1 Suitable sealing methods include adhesives, heat sealing, or folding and fastening. The pockets 74 are proportioned to be substantially larger than the insulation material 66 so that it forms a loose fit around the insulation material 66. The pockets 74 have at least one open end through which to insert the insulation material 86.

Insulation material 66 can be shaded similarly to insulation material 34 shown in FIG. 3 so that the material 66 can fit over rib 60 to position rib 60 in the center slot 68 of the insulation. Multiple pieces of material 66 can be used to cover rib 60 and spaces (or other shaped insulation) left where the ribs 66 and stringers 62 intersect. Also, one long piece of insulation material can be used to cover the rib 60.

FIG. 9 illustrates one method of producing the cover 70 having seams 72 to form pockets 74 where insulation material can be positioned. Seams 72 are shown running along the vertical and horizontal edges of the cover 70. Horizontal seams 73 are formed at spaced intervals allowing room to fit the lengths of insulation material 66. Using this technique a large number of irregular shaped insulation pieces may be enclosed with a "standard" sized cover. A major advantage of this invention is the cost savings of using standard sized covers to encase a variety of irregularly shaped insulation material.

Still another option of the insulation package of the present invention is shown in FIG. 8 and 9. The insulation package employs a double seam 76 separated by cutting line 78. The double seam 76 allows the cover 70 to be cut to include the desired number of pockets 74 to match the application requirements. Also, separate individual pockets can also be formed if desired.

Figure 10:
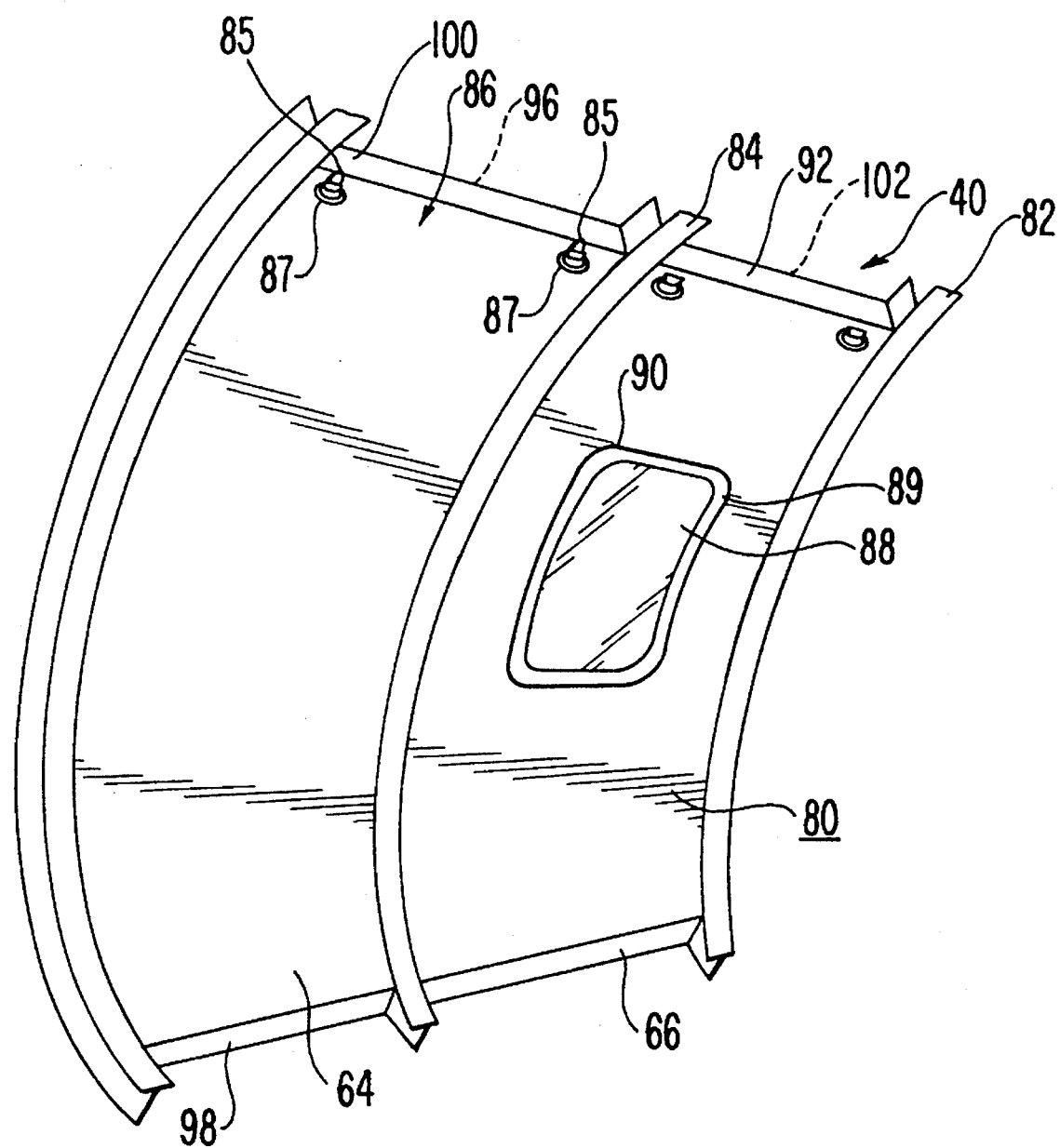
FIG. 10 is a perspective view of the interior of an aircraft with yet another embodiment of an insulation package of the present invention installed within the aircraft and including a hole for a window.

Another advantage of the loosely fitted cover of the present invention is the ability to form holes through the cover allowing the cover to be fit over obstacles, such as to form a window opening. FIG. 10 shows another embodiment of an insulation package of the present invention 80 lining an aircraft shell 86 and installed between ribs 82, 84. Insulation package 80 has an opening 89 sealed by seams 90 to provide access to a window 88 or other fixture on the vehicle's shell 86. Openings can be cut in the cover by the user and seams formed around the hole using adhesive, heat bonding or other appropriate technique. The loose-fitting nature of the present invention allows ready fitting and sealing of this opening around the modified insulation.

Also, the insulative package 80 may be merely packed in place or may be held in place through any of a variety of retention means, such as clips, hooks, snaps, hook-and-fasteners, etc. In the illustrated embodiment, reinforced apertures 85, extending partially or fully through the insulation package 80 are provided to be attached to hooks 87 affixed to the shell 86 of the vehicle. The apertures 85 should be sealed so as to prevent ingress of moisture though them into the insulation material. Additional apertures and corresponding hooks or other retention means may also be provided at the bottom and sides of the insulation package 80 to provide further support as needed.

In certain applications, it is desirable to have sections of the cover impermeable to liquid water and either permeable or impermeable to vapor moisture. To form a cover that has a combination of liquid water impermeability and vapor moisture permeability, portions of the cover can be formed from different materials having different permeability properties. Unlike some previous vehicle insulations which attempted to shield the insulation material from moisture vapor, at least a portion of the cover of the present invention can be constructed from a material which permits the free ingress and egress of air and moisture vapor. However, in order to help protect the vehicle from direct contact with water or other liquids, the cover may also be formed to be liquid impermeable.

Figure 11:
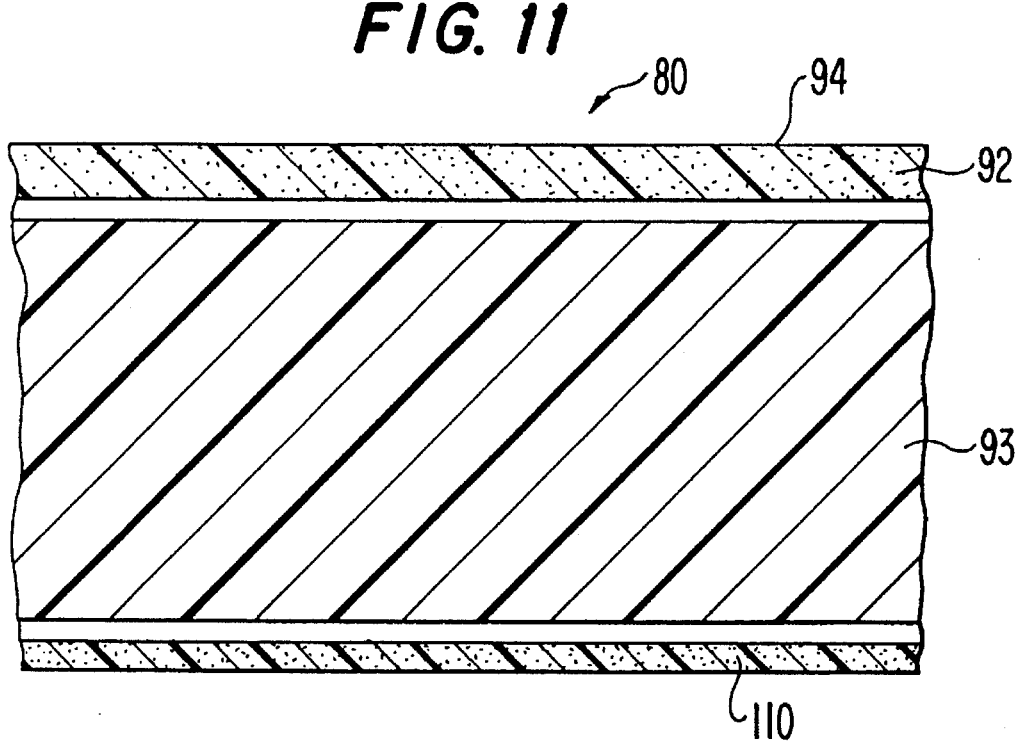
FIG. 11 is an enlarged cross-sectional view of another embodiment of the vehicle insulation package of the present invention.

Referring to FIGS. 10 and 11, to accomplish this dual function of air and moisture vapor permeability and water resistance, it is desirable to construct most if not all of the cover surface facing the vehicle shell 94 from an air permeable, moisture vapor permeable ("breathable"), water resistant material, such as one of a variety of commercially available fabrics employing a laminate of breathable fluoropolymer (e.g., porous polytetrafluoroethylene (PTFE), polyurethane, etc.). The covering can also be made from other suitable materials such as microporous membranes of polypropylene, polyolefin, polyurethane, polyethylene, etc.

FIG. 11 shows a cross-section of insulation package 80 of the present invention with a cover 92 surface facing toward the vehicle shell 94, insulation 93 and cover surface 110 facing the interior of the vehicle. Preferably, the material comprises a laminate of expanded fluoropolymer, and especially expanded PTFE, which has been stretched to form a porous network of fibrils and nodes. Such a product can be produced in a known manner, such as in accordance with the teachings of U.S. Pat. No. 3,953,566 issued Apr. 27, 1976, to Gore, incorporated by reference. This material is commercially available from W. L. Gore & Associates, Inc., Elkton, Md., under the trademark GORE-TEX ® and with the specification of a single component microporous expanded PTFE membrane. Additionally, although it may detract slightly from its breathability, it may be further desirable to coat portions of the expanded PTFE with a hydrophilic material such as polyurethane or similar substance, such as is disclosed in U.S. Pat. No. 4,194,041 issued Mar. 18, 1980, to Gore et al., incorporated by reference, to help protect the expanded PTFE from being compromised by oils or other contaminants. This latter material is also commercially available from W. L. Gore & Associates, Inc., under the trademark GORE-TEX® and with the specification of a bi-component microporous expanded PTFE membrane.

Materials produced in accordance with the teachings of these patents have the unusual properties of being moisture vapor permeable while being highly liquid repellent. As a result, moisture vapor in the air within the interior of the vehicle will readily pass into and out of the insulation package of the present invention, but liquid which may condense within the insulation package will remain safely contained within the package until it evaporates. Accordingly, although the insulation may become damp in this process, the breathable covers assures that moisture can freely pass out of the package once the moisture returns to a vapor state.

As such, the insulation of the present invention provides a distinct improvement over previous vehicle insulation methods. Unlike the use of sealed insulation packages made from impermeable material, the insulation material employed with the present invention is given ample opportunity to dry-out and lose its condensate weight gain when conditions permit.

For some applications it is believed to be preferable to place a completely impenetrable barrier between the insulation material and the shell of the vehicle. In tightly sealed vehicles such as jet aircraft, it is contemplated that little useful evaporation will occur through the shell side cover 96 of the insulation package. In light of this, it may be desirable to isolate the shell 86, ribs 82, 84 and/or other structural parts of the vehicle from both liquid water and water vapor. To accomplish this, the shell side covert surface 94 of the insulation package of the embodiment of FIGS. 10 and 11 can be formed from a completely impenetrable material such as MYLAR® polyester produced by E. I. dupont de Nemours and Company of Wilmington, Del., ORCON® metalized vapor barrier produced by Orcon Corporation of Union City, Calif., or any other impermeable products. Similarly, if side walls 98, 100 (see FIG. 10) are provided, these (or other discrete portions of the insulation package 80) may also be constructed from such material to address particular operational requirements.

Figure 12:
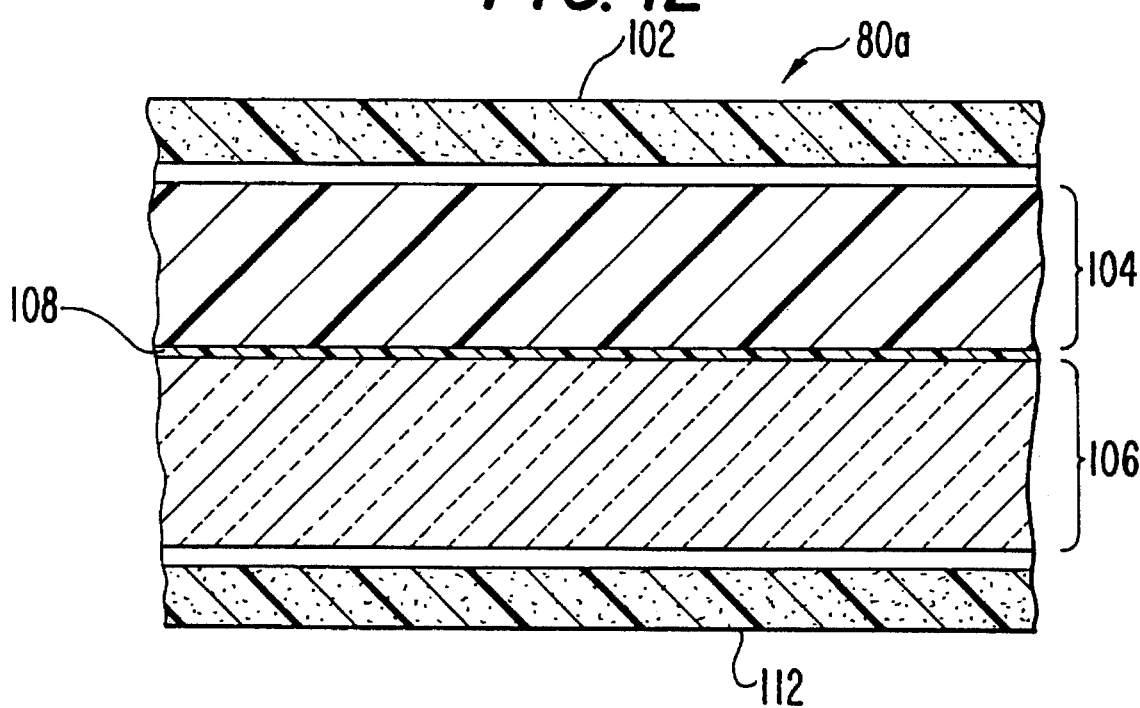
FIG. 12 is an enlarged cross-sectional view of another embodiment of the vehicle insulation package of the present invention.

FIG. 12 depicts another possible construction of an insulation package 80 of the present invention. In this embodiment, a cover surface 102 facing towards; the shell is provided which is also constructed from a moisture vapor permeable and waterproof material. In applications where evaporation can occur through both the interior and exterior surfaces of the insulation package 80a (e.g., in dividing walls within a vehicle or along the shell in less tightly sealed vehicles), this form of construction can greatly increase the surface area across which evaporation may occur. If the insulation package will undergo changes in air pressure (e.g., insulation in an airplane), the cover should also be formed of an air permeable material.

In order for the insulative package 80 of the present invention to be fully effective, it is important that all seams holding the case together be properly sealed to avoid the leakage of condensate through the seams. Seam sealing can be accomplished in any accepted manner, such as through application of waterproof seam sealing tape, use of seam sealing adhesive or other chemical sealing product, ultrasonic welding, fusing, heat sealing, etc.

As was previously mentioned, the present invention readily lends itself for use with multiple layers of insulation. In the embodiment shown in FIG. 12, two insulation layers are provided, a first layer 104 of an open cell foam (e.g., polyurethane, polyimide) and a second layer 106 of a fibrous material (e.g., fiberglass). Although the two layers 104, 106 may be placed in direct contact with each other, in this embodiment a barrier material 108 is provided between the two insulation layers 104, 106.

The barrier material 108 can play multiple roles in the present invention. For example, the barrier material may serve: to help isolate and protect the outer insulative layer of insulation from water vapor and/or liquid water; to prevent water vapor from passing through the insulative package 80a to the vehicle's shell; as an additional thermal and/or acoustical baffle for improved insulative properties; as an additional mechanism to help support the insulative material and retain it in place during operation; etc. Depending upon the properties sought, the barrier material 108 may comprise any suitable material, including a fully permeable fabric, a breathable/waterproof membrane, or a completely impermeable membrane.

It is believed that there may be instances where different combinations of materials may be useful for certain applications. For instance, for some uses, it may be desirable to form the exterior surface 102 of the insulation package 80 from a breathable material and the interior surface 112 from a moisture vapor impermeable material. As such, the insulation package 80a shown in FIG. 12 may simply be mounted with a moisture vapor impermeable material 110 facing inwardly toward the interior of the vehicle. Additionally, one or more layers of permeable, semi-permeable, or impermeable barrier material 108 may also be included to impart other specific characteristics to the insulation package.

It should be evident that the present invention has a wide range of possible applications. As has been explained, the insulation of the present invention can be used to insulate the exterior walls of many different types of vehicles. As such, the term "shell" as applied herein is intended to encompass any form of dividing structure used to define interior space of a vehicle, including without limitation: the fuselage of aircraft; bodies of automobiles and trucks; hulls or cabin walls of ships; roofs, doors, sidewalls, or floors of trailers or cargo containers; bodies of trains; etc.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An insulation package comprising at least one piece of irregularly shaped insulation material;

a protective cover surrounding the insulation material, the cover having edges and being loosely fitted around the insulation material with sufficient additional cover material so as to permit the cover to readily fit around the insulation material and match the shape of the insulation;

wherein the cover is formed at least in part from an air permeable material allowing flow of air into and out of the insulation package so as to permit the cover to form-fit around the insulation; and wherein the cover material includes a laminate of expanded polytetrafluoroethylene membrane.

2. The insulation package of claim 1 wherein the insulation material has a longitudinal length and has a slot fixed along its length, the cover closed over the insulation material so that a rib can fit into the slot.

3. An insulation package comprising at least one piece of irregularly shaped insulation material;

a protective cover surrounding the insulation material, the cover having edges and being loosely fitted around the insulation material with sufficient additional cover material so as to permit the cover to readily fit around the insulation material and match the shape of the insulation;

wherein the cover is formed at least in part from an air permeable material allowing flow of air into and out of the insulation package so as to permit the cover to form-fit around the insulation; and wherein the insulation material has a longitudinal length and has a slot fixed along its length, the cover closed over the insulation material so that a rib can fit into the slot.

* * * * *